US009399454B2

(12) United States Patent
Somerville et al.

(10) Patent No.: US 9,399,454 B2
(45) Date of Patent: Jul. 26, 2016

(54) TRANSMISSION WITH ELECTRONIC RANGE SELECTOR AND PULL OUT OF PARK CONTROL LOGIC

(71) Applicant: GM GLOBAL TECHNOLOGY OPERATIONS LLC, Detroit, MI (US)

(72) Inventors: James Robert Somerville, Highland, MI (US); Joel H. Gunderson, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 68 days.

(21) Appl. No.: 14/549,593

(22) Filed: Nov. 21, 2014

(65) Prior Publication Data
US 2016/0144845 A1    May 26, 2016

(51) Int. Cl.
*B60W 10/06* (2006.01)
*B60W 10/10* (2012.01)
*B60W 10/18* (2012.01)
*B60W 10/02* (2006.01)

(52) U.S. Cl.
CPC ............... *B60W 10/02* (2013.01); *B60W 10/06* (2013.01); *B60W 10/10* (2013.01); *B60W 10/182* (2013.01); *B60W 2510/188* (2013.01); *B60W 2710/02* (2013.01); *B60W 2710/065* (2013.01)

(58) Field of Classification Search
None
See application file for complete search history.

(56) References Cited

U.S. PATENT DOCUMENTS

| 2006/0049691 | A1* | 3/2006 | Deprez | B60T 7/00 303/191 |
| 2010/0252343 | A1* | 10/2010 | Hilberer | B60T 7/122 180/65.25 |
| 2013/0252785 | A1* | 9/2013 | Kinoshita | B60K 28/12 477/97 |
| 2014/0345989 | A1* | 11/2014 | Oshio | B60T 7/107 188/162 |
| 2015/0061365 | A1* | 3/2015 | Sakashita | B60T 7/042 303/15 |

* cited by examiner

Primary Examiner — Edwin A Young
(74) Attorney, Agent, or Firm — Quinn Law Group, PLLC

(57) ABSTRACT

A vehicle includes a transmission, and an Electronic Transmission Range Selection (ETRS) system. The transmission has a plurality of clutches, a park pawl, and a park sensor. The ETRS system has a controller and an electronic range selector device. The controller is programmed to detect a delay in pull out of the park pawl from a park position and to control an action of the vehicle in response to the delay by receiving an electronic range request signal to shift from a park operating range to another operating range; receiving a park pawl position signal from the park sensor; determining if pull out of the park pawl from the park position has not occurred by a predetermined time; and increasing one of a line pressure, a clutch pressure, and an idle speed if pull out of the park pawl from the park position has not occurred by the predetermined time.

20 Claims, 3 Drawing Sheets

TRANSMISSION WITH ELECTRONIC RANGE SELECTOR AND PULL OUT OF PARK CONTROL LOGIC

TECHNICAL FIELD

The present disclosure relates to a transmission having an electronic range selector and pull out of park control logic.

BACKGROUND

A conventional automatic vehicle transmission includes a shift lever positioned in a vehicle interior in easy reach of a driver of the vehicle. Movement of the shift lever enables the driver to manually select a desired transmission operating range, usually from park, reverse, neutral, drive, and first gear/low. This lever, which is referred to as a PRNDL lever in the art, is mechanically coupled to a shift valve of the transmission by a length of cable. Tension on the cable during actuation of the shift lever moves the shift valve to thereby enable the selected operating range.

An Electronic Transmission Range Select (ETRS) system may be used as an alternative to a mechanically-actuated PRNDL lever. An ETRS system dispenses with the cable in favor of transmitting electronic signals, either to the shift valve or to flow/pressure control solenoids depending on the design. ETRS systems thus enable by-wire range selection, which can help to reduce weight while providing other performance advantages.

As is well known in the art, transmission park systems typically engage a park gear using a park pawl. The park gear is connected to a transmission output member. Thus, whenever the driver shifts the transmission into park, the park pawl is moved into a park position and teeth or splines of the park pawl engage mating teeth or splines of the park gear to prevent rotation of the output member. When the driver shifts the transmission out of park, the park pawl is pulled out of the park position and the teeth or splines of the park pawl disengage from the mating teeth or splines of the park gear to enable rotation of the output member. Pull out of the park pawl from the park position may be achieved by pulling, pushing, or torqueing the park pawl to move it from the park position.

When the transmission of a vehicle with an ETRS system is shifted from the park operating range to another operating range, a delay in pull out of the park pawl from the park position may occur. The delay may be caused by a lack of sufficient force to move the park pawl from the park position due to insufficient hydraulic pressure, loading of the park pawl, for example when the vehicle is parked on a grade, or other vehicle and transmission conditions. In some circumstances, it may not be possible to remove the park pawl from the park position, even after a delay.

SUMMARY

A vehicle is disclosed herein having an engine, a transmission, and an Electronic Transmission Range Selection (ETRS) system. The engine has an idle speed. The transmission is connected to the engine and has a hydraulic pressure source, a plurality of clutches, a shift valve, a park pawl, and a park sensor. The hydraulic pressure source supplies hydraulic fluid at line pressure. The clutches each have a respective clutch pressure. The shift valve, which is in fluid communication with the hydraulic pressure source and the plurality of clutches, is operable to shift the transmission to a requested operating range via the plurality of clutches. The park pawl is pulled out of a park position to shift the transmission out of a park operating range via one or more of the clutches when the transmission is requested to shift from the park operating range to another operating range. The park sensor is configured to determine if the park pawl is pulled out of the park position. The ETRS system has a controller and an electronic range selector device. The electronic range selector device is operable to transmit an electronic range request signal to the controller to request a shift of the transmission to the requested operating range.

The controller is programmed to detect a delay in pull out of the park pawl from the park position when the transmission is requested to shift from the park operating range to another operating range. The controller is also programmed to control an action of the vehicle in response to the delay by receiving the electronic range request signal to shift from the park operating range to another operating range from the electronic range selector device. Additionally, the controller receives a park pawl position signal from the park sensor indicative of the park pawl being pulled out of the park position, determines if pull out of the park pawl from the park position has not occurred by a predetermined time after the range request signal has been received, and increases the line pressure, the clutch pressures, and/or the idle speed if pull out of the park pawl from the park position has not occurred by the predetermined time.

A system for use in a vehicle having an engine and a transmission is also disclosed herein. The system includes a hydraulic pressure source, a plurality of clutches, a shift valve, a park pawl, a park pawl sensor, and an Electronic Transmission Range Selection (ETRS) system. The hydraulic pressure source supplies hydraulic fluid at line pressure. The clutches each have a respective clutch pressure. The shift valve is in fluid communication with the hydraulic pressure source and the plurality of clutches, and is operable to shift the transmission to a requested operating range via the plurality of clutches. The park pawl is pulled out of a park position to shift the transmission out of a park operating range via one or more of the clutches when the transmission is requested to shift from the park operating range to another operating range. The park sensor is configured to determine if the park pawl is pulled out of the park position. The ETRS system has a controller and an electronic range selector device. The electronic range selector device is operable to transmit an electronic range request signal to the controller to request the shift of the transmission to the requested operating range.

The controller is in communication with the electronic transmission range selection system and the park sensor. The controller is programmed to receive the electronic range request signal to shift from the park operating range to another operating range from the electronic range selector device, and to receive a park pawl position signal from the park sensor indicative of the park pawl being pulled out of the park position. The controller also determines if pull out of the park pawl from the park position has not occurred by a predetermined time after the range request signal has been received, and increases the line pressure, the clutch pressures, and/or an idle speed of the engine if pull out of the park pawl from the park position has not occurred by the predetermined time.

An example method is also disclosed herein. The method is for controlling a vehicle having a transmission and an Electronic Transmission Range Selection (ETRS) system in response to a delay in pull out of a park pawl from a park position when a shift from a park operating range to another operating range is requested. The method includes receiving, via a controller, an electronic range request signal from an electronic range selector device, sending a pull out of park signal to a shift valve of the transmission, and receiving, via the controller, a park pawl position signal from a park sensor. The method also includes determining, via the controller, if a park pawl is not pulled out a park position by a predetermined time after the electronic range request signal has been received, and executing a control action with respect to the vehicle when the park pawl has not been pulled out the park position by the predetermined time. The control action may include increasing a line pressure, a clutch pressure, and/or an idle speed.

The vehicle, system, and method disclosed herein detect a delay in pull out of the park pawl from the park position in a vehicle with an ETRS system and take pre-emptive actions that may allow the driver to shift out of the park operating range to another operating range with little or no delay.

The above features and advantages and other features and advantages of the present teachings are readily apparent from the following detailed description of the best modes for carrying out the present teachings when taken in connection with the accompanying drawings.

DETAILED DESCRIPTION

Figure 1:
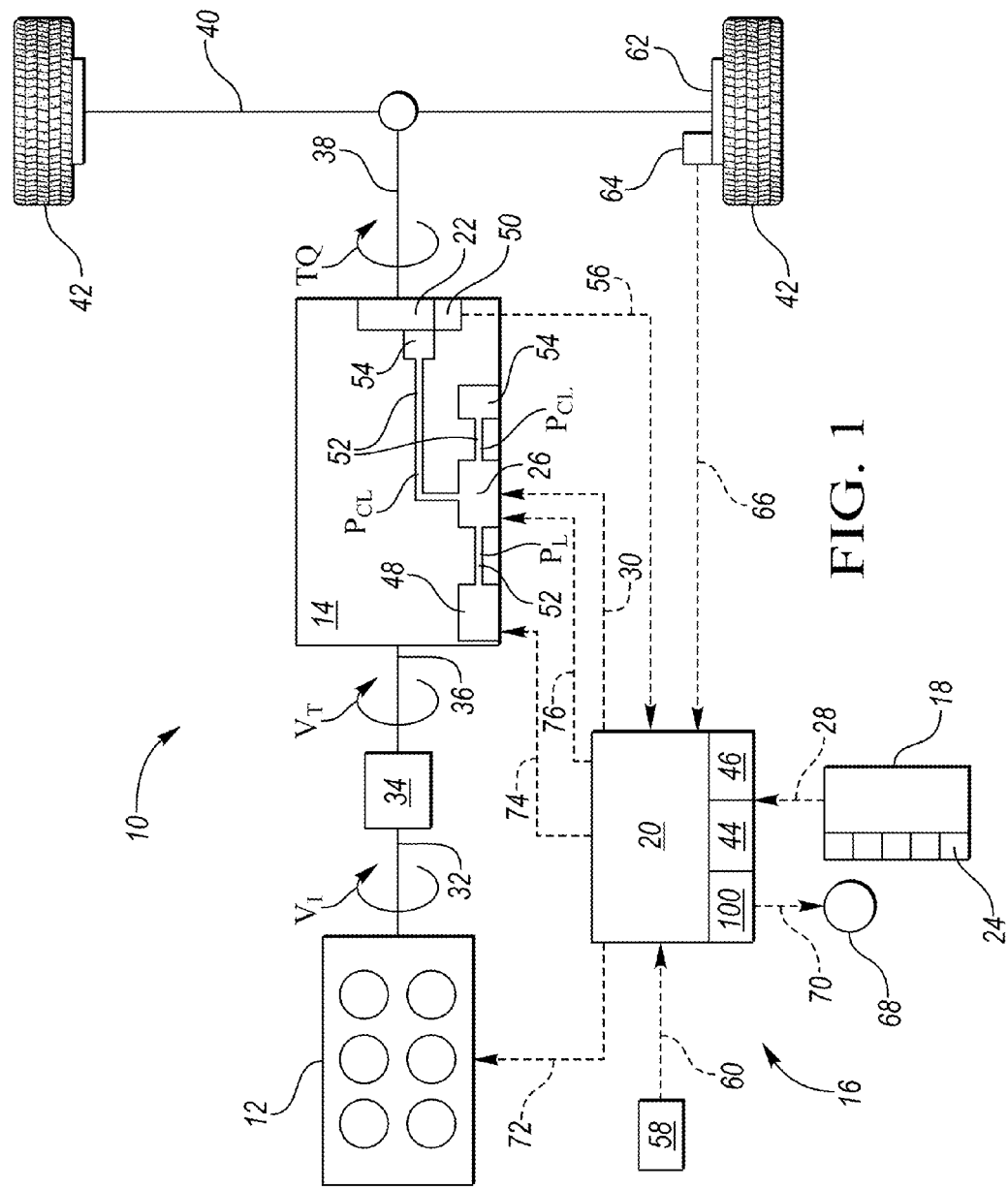
FIG. 1 is a schematic illustration of a vehicle having an Electronic Transmission Range Selection (ETRS) system controlled during a pull out of park event as set forth herein.

Referring to the drawings, an example vehicle 10 is shown schematically in FIG. 1 having an internal combustion engine 12 and an automatic transmission 14 connected to the engine 12. The engine 12 has an idle speed $V_I$. The vehicle 10 is equipped with an Electronic Transmission Range Selection (ETRS) system 16 that is operable for commanding a range shift of the transmission 14, electronically/by-wire, into a desired operating range. Such a range typically includes park (P), reverse (R), neutral (N), drive (D), and $1^{st}$ gear/low (L), i.e., the conventional PRNDL range.

The ETRS system 16 includes an electronic range selector device 18 and a controller 20. The electronic range selector device 18 is operable to transmit an electronic range request signal (arrow 28) to the controller 20 to request a shift of the transmission 14 to the requested operating range. The controller 20 is configured, i.e., equipped in hardware and programmed in software, to execute instructions embodying a method 100, an example of which is provided in FIG. 5 and described below with reference to FIG. 5. Execution of the method 100 ultimately controls a pull out of park operation of the vehicle 10 and provides driver notification when necessary. The method 100 helps to ensure that a park pawl 22 of the transmission 14 is pulled out of a park position with little or no delay.

The electronic range selector device 18 may include a plurality of push-buttons 24. Each push-button 24 corresponds to a desired operating range of the transmission, e.g., separate push-buttons 24 for park (P), reverse (R), neutral (N), drive (D), and $1^{st}$ gear/low (L). The term "push-button" applies herein to any suitable by-wire actuated input, whether embodied as spring-biased buttons, as icons displayed on a touch-sensitive electronic display, as a shift lever, or otherwise.

Key to the present approach is that the electronic range selector device 18 is not mechanically connected to a shift valve 26. Instead, a depression of one of the push-buttons 24 causes a transmission of the electronic range selection signal 28 to the controller 20, which receives the transmitted range selection signal (arrow 28) and commands a shift of the transmission 14 to the corresponding operating range. The operating range is commanded via transmission of a shift control signal (arrow 30) to the shift valve 26 or to multiple solenoids or other flow or pressure control valves located in the transmission 14, depending on the embodiment.

With further reference to the structure of the example vehicle 10 as shown in FIG. 1, the engine 12 includes an output shaft 32 that rotates at engine speed. The engine speed may be the idle speed $V_I$, as shown. A hydrodynamic torque converter 34 is connected to the output shaft 32, as well as to an input member 36 of the transmission 14. The input member 36 rotates at a transmission input speed (arrow $V_T$). As is known in the art, the torque converter 34 provides desired multiplication of torque from the engine 12 into the transmission 14 at low speeds. Other embodiments of the vehicle 10 may use a clutch or clutch and damper assembly in lieu of the torque converter 34 without departing from the intended inventive scope. Likewise, the powertrain of the vehicle 10 may include one or more electric traction motors in an optional hybrid embodiment to provide additional sources of input torque.

The transmission 14 also includes an output member 38 that delivers output torque (arrow TQ) to one or more drive axles 40, and ultimately to a set of drive wheels 42. As is well known in the art, transmission park systems typically engage a park gear, not shown, using a park pawl 22. Although the park pawl 22 is shown schematically for illustrative simplicity, those of ordinary skill in the art will recognize that such a device has teeth or splines (not shown) that mate with teeth or splines of a park gear (not shown) of the transmission 14. The park gear is connected to the transmission output member 38. Thus, whenever a driver shifts the transmission 14 into a park operating range, the park pawl 22 is moved into a park position and teeth or splines of the park pawl (not shown) engage mating teeth or splines of the park gear (not shown) to prevent rotation of the output member 38. When the driver shifts the transmission 14 out of the park operating range, the park pawl 22 is pulled out of the park position and teeth or splines of the park pawl disengage from the mating teeth or splines of the park gear to enable rotation of the output member 38. Pull out of the park pawl 22 from the park position is defined as pulling, pushing, or torqueing the park pawl 22 to move it out of the park position.

The controller 20 of FIG. 1 may be embodied as a computer device, or multiple such devices, each having one or more processors 44 and memory 46. The memory 46 includes sufficient amounts of tangible, non-transitory memory, e.g., optical or magnetic read only memory (ROM), erasable electrically-programmable read only memory (EEPROM), flash memory, and the like, as well as transient memory such as random access memory (RAM). Although omitted for clarity, the controller 20 also includes a high-speed clock, analog-to-digital (A/D) circuitry, digital-to-analog (D/A) circuitry, any required input/output (I/O) circuitry and devices, and signal conditioning/buffering/filtering electronics.

Figure 5:
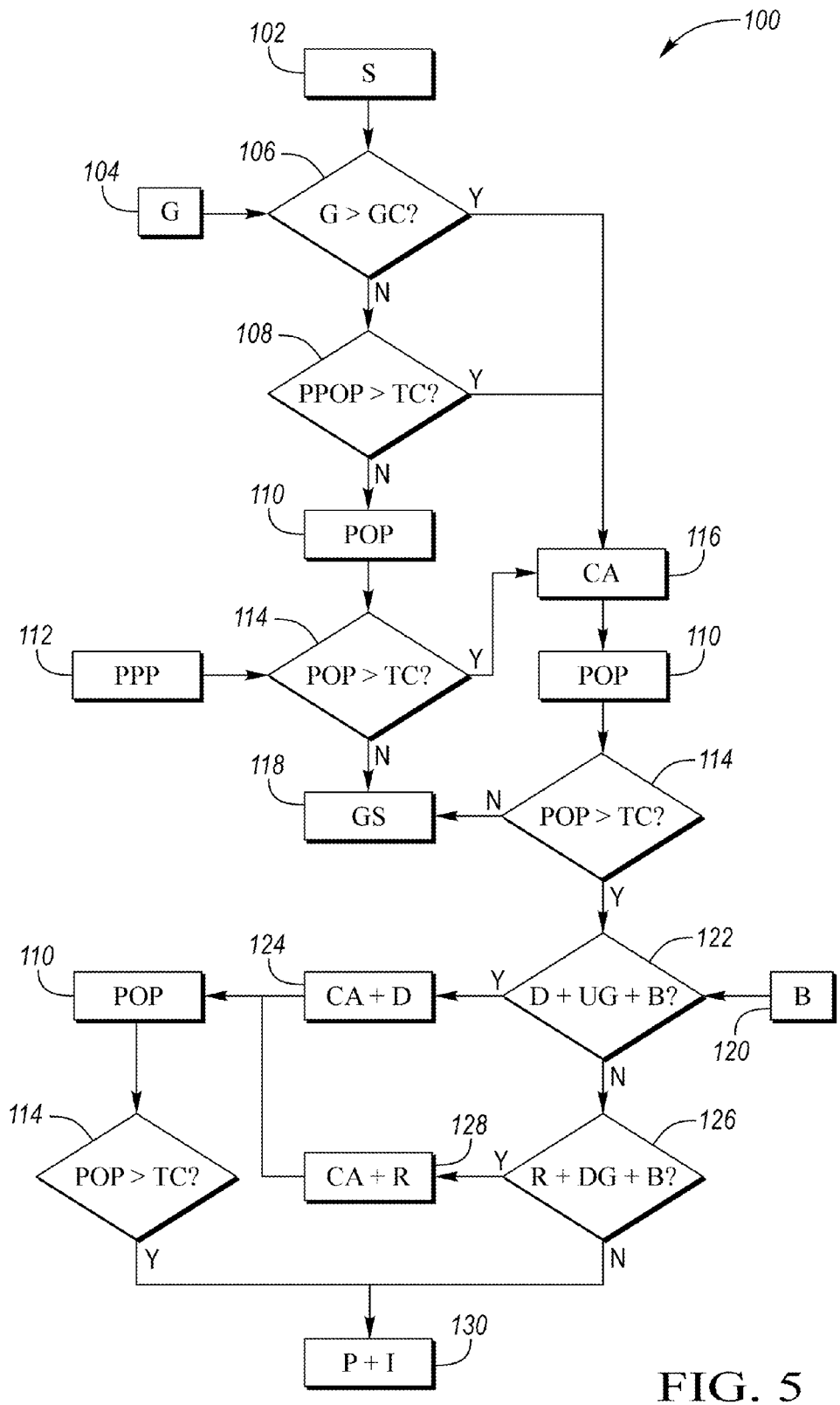
FIG. 5 is a flowchart showing an example method of controlling the ETRS system of the vehicle shown in FIG. 1 during a pull out of park event.

Individual control algorithms resident in the controller 20 or readily accessible thereby, such as instructions embodying the method 100 of FIG. 5, may be stored in memory 46 and automatically executed via the processor 44 to provide the respective control functionality. Possible control actions resulting from execution of the method 100 are described in detail below.

The transmission 14 includes a hydraulic pressure source 48, a plurality of clutches 54, the shift valve 26, the park pawl 22, and a park sensor 50. The hydraulic pressure source 48 supplies hydraulic fluid 52 at line pressure $P_L$. The plurality of clutches 54 each have respective clutch pressures $P_{CL}$. The shift valve 26 is in fluid communication with the hydraulic pressure source 48 and the plurality of clutches 54 and is operable to shift the transmission 14 to a requested operating range via the plurality of clutches 54. The park pawl 22 is pulled out of a park position to shift the transmission 14 out of a park operating range via one or more of the clutches 54 when the transmission 14 is requested to shift from the park operating range to another operating range. The park sensor 50 is operable to determine if the park pawl 22 is pulled out of the park position. The park sensor 50 sends a park pawl position signal (arrow 56) to the controller 20. The park sensor 50 may be a Hall Effect sensor or may be any other suitable sensor for determining if the park pawl 22 is pulled out of the park position.

Figure 2:
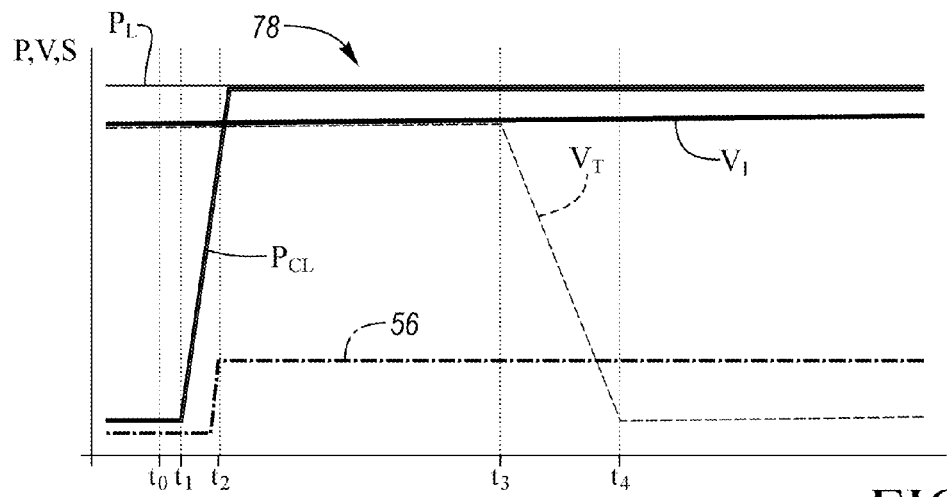
FIG. 2 is an example time plot of hydraulic pressure, rotational speed, and electronic signal parameters of the vehicle shown in FIG. 1 during a normal pull out of park event, with time plotted on the horizontal axis and hydraulic pressure, rotational speed, and electronic signal parameters plotted on the vertical axis.

Referring now to FIG. 2, a first schematic time plot 78 shows a normal pull out of the park and garage shift operation of the ETRS system 16, i.e., a shift from the park operating range to a drive, low, or reverse operating range. The time plot 78 includes both a pull out of park operation, defined as removal of the park pawl 22 of FIG. 1 from the park position and a garage shift, defined as shifting of the transmission 14 from the park operating range into a drive, low, or reverse operating range. Time t is schematically depicted on the horizontal axis. Hydraulic pressure P, rotational speed V, and electronic signal S parameters are schematically depicted on the vertical axis. In particular, the time plot 78 schematically plots line pressure $P_L$, clutch pressures $P_{CL}$, engine output shaft 32 idle speed $V_I$, transmission input shaft 36 speed $V_T$, and park pawl position signal 56 versus time t.

At a start or zero time $t_0$, the driver requests a shift from the park operating range to another operating range by providing an input to the electronic range selector device 18 of FIG. 1. At $t_0$, the engine output shaft 32 and the transmission input shaft 36 are both at idle speed $V_I$, the hydraulic fluid 52 at the hydraulic pressure source 48 is at line pressure $P_L$, the clutch pressures $P_{CL}$ are at zero or low pressure, and the park pawl position signal 56 indicates that the park pawl 22 is in the park position. For example, at $t_0$ the idle speed $V_I$ may be 500 rpm, line pressure $P_L$ may be 800 kPa, clutch pressures $P_{CL}$ may be zero, and the park pawl position sensor 56 may indicate zero volts. Other speeds, pressures, and electronic signals are possible depending on the specific embodiment.

At $t_1$, the clutch pressures $P_{CL}$ begin to build up. As an example, the time between $t_0$ and $t_1$ may be 50 ms. Other times are possible depending on the specific embodiment. At pull out of park time $t_2$, the clutch pressure $P_{CL}$ is sufficient to remove the park pawl 22 from the park position, and the park pawl position signal 56 indicates that the park pawl 22 is out of the park position. For example, the time between $t_2$ and $t_1$ may be 150 ms, the clutch pressures $P_{CL}$ may rise to 800 kPa, and the park pawl position signal 56 may indicate a voltage greater than zero. Thus, the overall pull out of park time between $t_0$ and $t_2$ may be 200 ms. Other times, pressures, and electronic signals are possible depending on the specific embodiment.

At $t_3$, an inertia phase of the garage shift begins. The garage shift inertia phase is completed by garage shift complete time $t_4$. Between $t_3$ and $t_4$, the transmission input shaft 36 speed $V_T$ decreases from idle speed $V_I$ to zero or near zero rpm. As an example, the time between $t_0$ and $t_3$ may be 500 ms, and the time between $t_3$ and $t_4$ may be 500 ms. Thus, the overall pull out of park and garage shift operation time between $t_0$ and $t_4$ may be a total of 1000 ms. Other times are possible depending on the specific embodiment.

Figure 3:
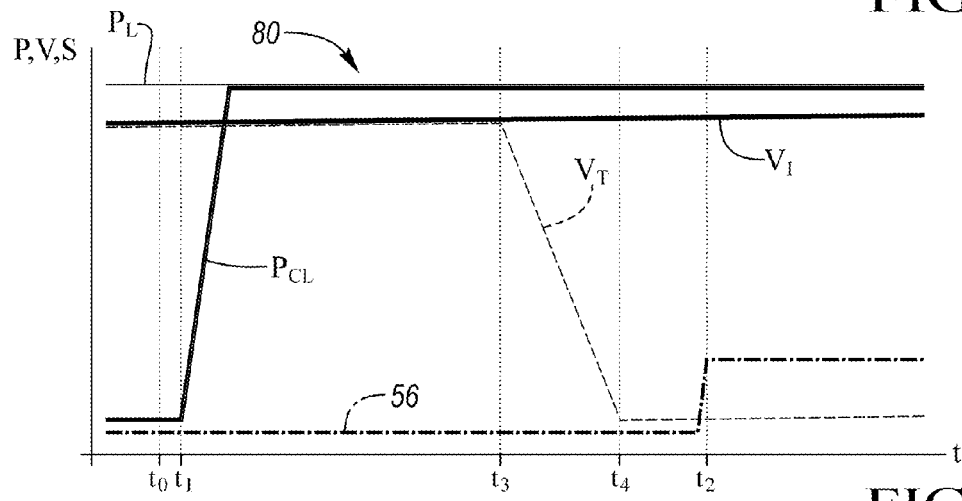
FIG. 3 is an example time plot of hydraulic pressure, rotational speed, and electronic signal parameters of the vehicle shown in FIG. 1 during a delayed pull out of park event without the control as set forth herein, with time plotted on the horizontal axis and hydraulic pressure, rotational speed, and electronic signal parameters plotted on the vertical axis.

Referring now to FIG. 3, a second schematic time plot 80 shows a delayed pull out of park and garage shift operation of the ETRS system 16. As in FIG. 2, time t is schematically depicted on the horizontal axis. Hydraulic pressure P, rotational speed V, and electronic signal S parameters are schematically depicted on the vertical axis. In particular, the time plot 80 schematically plots line pressure $P_L$, clutch pressures $P_{CL}$, engine output shaft 32 idle speed $V_I$, transmission input shaft 36 speed $V_T$, and park pawl position signal 56 versus time t.

At start time $t_0$, the driver requests a shift from the park operating range to another operating range by providing an input to the electronic range selector device 18 of FIG. 1. At $t_0$, the engine output shaft 32 and the transmission input shaft 36 are both at idle speed $V_I$, the hydraulic fluid 52 at the hydraulic pressure source 48 is at line pressure $P_L$, the clutch pressures $P_{CL}$ are at zero or a low pressure, and the park pawl position signal 56 indicates that the park pawl 22 is in the park position. As an example, at $t_0$ the idle speed $V_I$ may be 500 rpm, line pressure $P_L$ may be 800 kPa, clutch pressures $P_{CL}$ may be zero kPa, and the park pawl position sensor 56 may indicate zero volts. Other speeds, pressures, and electronic signals are possible depending on the specific embodiment.

At $t_1$, the clutch pressures $P_{CL}$ begin to build up. For example, the time between $t_0$ and $t_1$ may be 50 ms. Other times are possible depending on the specific embodiment. However, in this case, the clutch pressures $P_{CL}$ are not sufficient to remove the park pawl 22 from the park position, and the park pawl position signal 56 continues to indicate that the park pawl 22 is in the park position. This delay in the pull out of park operation may be caused by a lack of sufficient force to remove the park pawl 22 from the park position resulting from insufficient hydraulic pressure, loading of the park pawl 22, for example when the vehicle 10 is parked on a grade, or other vehicle 10 and transmission 14 conditions.

At $t_3$, the inertia phase of the garage shift begins. The garage shift inertia phase is completed by garage shift complete time $t_4$. Between $t_3$ and $t_4$, the transmission input shaft 36 speed $V_T$ decreases from idle speed $V_I$ to zero or near zero rpm. For example, the time between $t_0$ and $t_3$ may be 500 ms, the time between $t_3$ and $t_4$ may be 500 ms. Other times are possible depending on the specific embodiment.

The park pawl 22 may be pulled out of the park position at $t_2$, after the garage shift is complete at $t_4$, as shown. As an example, the time between $t_2$ and $t_0$ may be 1150 ms or longer.

Thus, the overall pull out of park and garage shift operation time may be delayed by 150 ms or more to a total of 1150 ms or longer. Alternatively, there may never be enough force to pull the park pawl 22 out of the park position and the output member 38 may be prevented from rotating. Other times, pressures, and electronic signals are possible depending on the specific embodiment.

Figure 4:
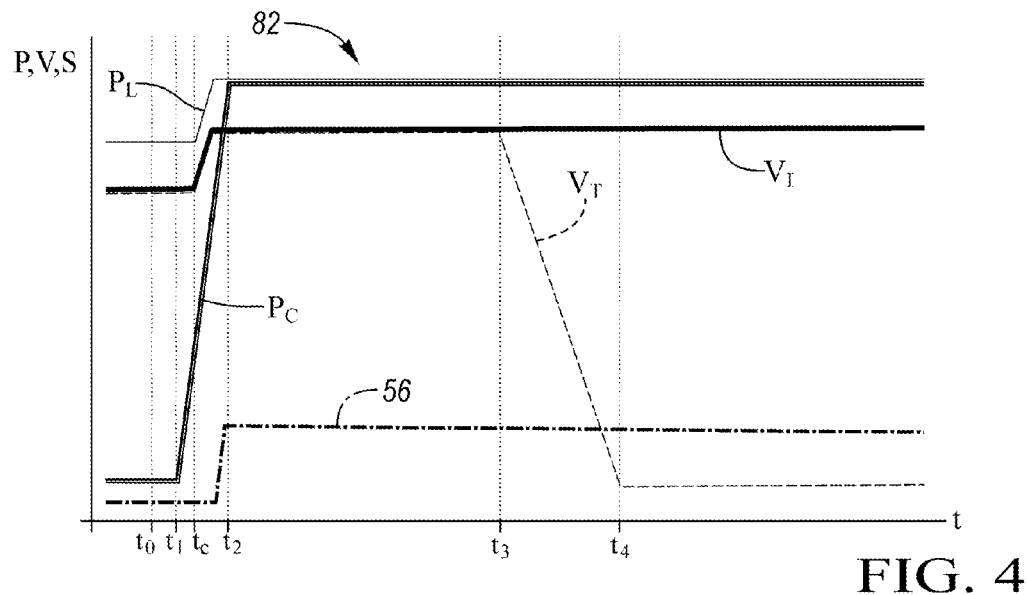
FIG. 4 is an example time plot of hydraulic pressure, rotational speed, and electronic signal parameters of the vehicle shown in FIG. 1 during a potentially delayed pull out of park event with the pull out of park event controlled as set forth herein, with time plotted on the horizontal axis and hydraulic pressure, rotational speed, and electronic signal parameters plotted on the vertical axis.

Referring now to FIG. 4, a third schematic time plot 82 shows an example pull out of park and garage shift operation of the ETRS system 16 during a delayed pull out of park event with the pull out of park event controlled as set forth herein. As in FIGS. 2 and 3, time t is schematically depicted on the horizontal axis. Hydraulic pressure P, rotational speed V, and electronic signal S parameters are schematically depicted on the vertical axis. In particular, the time plot 82 schematically plots line pressure $P_L$, clutch pressures $P_{CL}$, engine output shaft 32 idle speed $V_I$, transmission input shaft 36 speed $V_T$, and park pawl position signal 56 versus time t.

At start time $t_0$, the driver requests a shift from the park operating range to another operating range by providing an input to the electronic range selector device 18 of FIG. 1. At $t_0$, the engine output shaft 32 and the transmission input shaft 36 are both at idle speed $V_I$, the hydraulic fluid 52 at the hydraulic pressure source 48 is at line pressure $P_L$, the clutch pressures $P_{CL}$ are at zero kPa or at a low pressure, and the park pawl position signal 56 indicates that the park pawl 22 is in the park position. For example, at $t_0$ the idle speed $V_I$ may be 500 rpm, line pressure $P_L$ may be 800 kPa, clutch pressures $P_{CL}$ may be zero kPa, and the park pawl position sensor 56 may indicate zero volts. Other speeds, pressures, and electronic signals are possible depending on the specific embodiment.

At $t_1$, the clutch pressure $P_{CL}$ begins to build up. For example, the time between $t_0$ and $t_1$ may be 50 ms. Other times are possible depending on the specific embodiment. In this case, a delay in pull out of the park pawl 22 from the park position occurs. However, at a calibration or predetermined time $t_C$ the delay in pull out of the park pawl 22 from the park position is detected and mitigation of the delay through control actions taken by the controller 20 begins. In this example, idle speed $V_I$, line pressure $P_L$, and clutch pressures $P_{CL}$ are increased by the controller 20. For example, the time between the calibration time $t_C$ and the time $t_0$ may be 200 ms, the idle speed $V_I$ may be increased to 800 rpm, the line pressure $P_L$ may be increased to 1,200 kPa, and the clutch pressures $P_{CL}$ may be increased to 1,200 kPa. Other times, pressures, and signals are possible depending on the specific embodiment. In other embodiments, fewer, more, and/or different control actions may be commanded by the controller 20.

At pull out of park time $t_2$, the clutch pressures $P_{CL}$ are sufficient to remove the park pawl 22 from the park position, and the park pawl position signal 56 indicates that the park pawl 22 is out of the park position. As an example, the time between the time $t_2$ and the calibration time $t_C$ may be 100 ms. Thus, the overall pull out of park operation time between $t_0$ and $t_2$ may thus be 300 ms. Other times, pressures, and electronic signals are possible depending on the specific embodiment.

At $t_3$, the inertia phase of the garage shift begins. The garage shift inertia phase is completed by garage shift complete time $t_4$. Between $t_3$ and $t_4$, the transmission input shaft 36 speed $V_T$ decreases from idle speed $V_I$ to zero or near zero rpm. As an example, the time between $t_0$ and $t_3$ may be 500 ms, and the time between $t_3$ and $t_4$ may be 500 ms. Thus, the overall pull out of park and garage shift operation time between $t_0$ and $t_4$ may not be delayed at a total of 1000 ms. Other times are possible depending on the specific embodiment.

Referring again to FIG. 1, the controller 20 is programmed to detect a delay in pull out of the park pawl 22 from the park position when the transmission 14 is requested to shift from the park operating range to another operating range and to control an action of the vehicle 10 in response to the delay. The controller 20 accomplishes this by receiving the electronic range request signal 28 to shift from the park operating range to another operating range from the electronic range selector device 18. The controller 20 also receives a park pawl position signal 56 from the park sensor 50, determines if pull out of the park pawl 22 from the park position has not occurred by a predetermined or calibration time $t_C$ after the range request signal 28 has been received, and increases one of the line pressure $P_L$, the clutch pressures $P_{CL}$, and the idle speed $V_I$ if pull out of the park pawl 22 from the park position has not occurred by the predetermined time $t_C$. The controller 20 may send an idle speed signal (arrow 72) to the engine 12 to increase the idle speed $V_I$. The controller 20 may send a line pressure signal (arrow 74) to the hydraulic pressure source 48 or to solenoids or other flow or pressure control valves (not shown) located in the transmission 14 to increase the line pressure $P_L$. The controller 20 may also send a clutch pressure signal (arrow 76) to the one or more clutch solenoids or other flow or pressure control valves (not shown) located in the transmission 14 to increase the one or more of the clutch pressures $P_{CL}$.

The vehicle 10 may include a grade sensor 58 configured to detect an upgrade and a downgrade relative to the vehicle direction. Vehicle direction is defined as the direction for forward travel of the vehicle 10 when the vehicle 10 is in the drive operating range. The controller 20 may be programmed to receive an electronic grade signal 60 from the grade sensor 58 to determine if the upgrade exceeds a predetermined upgrade and the downgrade exceeds a predetermined downgrade. The controller may also increase one of the line pressure $P_L$, the clutch pressures $P_{CL}$, and the idle speed $V_I$ when one of the predetermined upgrade and the predetermined downgrade is detected and when the electronic range request signal 28 to shift from the park operating range to another operating range is received from the electronic range selector device 18.

The controller 20 of FIG. 1 may be programmed to increase one of the line pressure $P_L$, the clutch pressures $P_{CL}$, and the idle speed $V_I$ when the electronic range request signal 28 to shift from the park operating range to another operating range is received from the electronic range selector device 18 and pull out of the park pawl 22 from the park position did not occur by the predetermined time $t_C$ in a previous shift from the park operating range to another operating range.

The vehicle 10 may include a brake 62 having a brake sensor 64 configured to determine if the brake 62 is applied. The brake sensor 64 may detect a brake hydraulic pressure, a brake position, or any other suitable measure of brake application. The controller 20 may be programmed to receive a brake application signal (arrow 66) from the brake sensor 64 and to increase one of the line pressure $P_L$, the clutch pressures $P_{CL}$, and the idle speed $V_I$ and to apply a drive operating range when the electronic range request signal 28 to shift from the park operating range to the drive operating range is received from the electronic range selector device 18, the upgrade exceeds the predetermined upgrade, and the brake 52 is applied. The controller 10 may be programmed to increase one of the line pressure $P_L$, the clutch pressures $P_{CL}$, and the idle speed $V_I$ and to apply a reverse operating range when the electronic range request signal 28 to shift from the park operating range to the reverse operating range is received from the electronic range selector device 18, the downgrade exceeds the predetermined downgrade, and the brake 62 is applied.

The controller 20 may be programmed to return the transmission 14 to the park operating range if pull out of the park pawl 22 from the park position has not occurred by the predetermined time $t_C$ after increasing one of the line pressure $P_L$, the clutch pressures $P_{CL}$, and the idle speed $V_I$.

The vehicle 10 may include an indicator device 68. The controller 20 may be programmed to transmit an indicator signal (arrow 70) to the indicator device 68 if pull out of the park pawl 22 from the park position has not occurred by the predetermined time $t_C$ after increasing one of the line pressure $P_L$, the clutch pressures $P_{CL}$, and the idle speed $V_I$. The controller 20 may be programmed to return the transmission 14 to the park operating range and to transmit an indicator signal 70 to the indicator device 68 if pull out of the park pawl 22 from the park position has not occurred by the predetermined time $t_C$ after increasing one of the line pressure $P_L$, the clutch pressures $P_{CL}$, and the idle speed $V_I$ and applying one of the drive operating range and the reverse operating range. The indicator device 68 may include any one or more of a driver information center, a display screen, an audio speaker, and an indicator lamp depending on the embodiment.

FIG. 5 illustrates an example embodiment of the method 100 of FIG. 1. The method 100 is suitable for controlling the vehicle 10 of FIG. 1 having the transmission 14 and the ETRS system 16 in response to a delay in pull out of the park pawl 22 from the park position when a shift from the park operating range to another operating range is requested.

Referring now to FIGS. 1 and 5, the method 100 begins with step 102, which includes receiving, via the controller 20 of FIG. 1, the electronic range request signal 28 from the electronic range selector device 18. At step 104, the method 100 may include receiving, via the controller 20, the grade signal 60 from the grade sensor 58 of FIG. 1. At step 106, the method 100 may include determining, via the controller 20, if a grade exceeds one of a predetermined upgrade and a predetermined downgrade. If the grade does not exceed one of the predetermined upgrade and the predetermined downgrade, the method 100 may proceed to step 108, to be described below. If the grade exceeds one of the predetermined upgrade and the predetermined downgrade, the method 100 may proceed to step 116, to be described below.

At step 108, the method 100 may include determining, via the controller 20 of FIG. 1, if the park pawl 22 was not pulled out of the park position by a predetermined time $t_C$ after the electronic range request signal 28 was received in a previous shift from the park operating range to another operating range. If the park pawl 22 was pulled out of the park position by the predetermined time $t_C$ after the electronic range request signal 28 was received in the previous shift from the park operating range to another operating range, the method 100 may proceed to step 110, to be described below. If the park pawl 22 was not pulled out of the park position by the predetermined time $t_C$ after the electronic range request signal 28 was received in the previous shift from the park operating range to another operating range, the method 100 may proceed to step 116, as described below.

At step 110, the method 100 includes sending the pull out of park signal 30 to the shift valve 26 of the transmission 14 of FIG. 1. At step 112, the method 100 includes receiving, via the controller 20, the park pawl position signal 56 from the park sensor 50. At step 114, the method 100 includes determining, via the controller 20, if the park pawl 22 is not pulled out the park position by a predetermined time $t_C$ after the electronic range request signal 28 has been received. If the park pawl 22 is not pulled out of the park position by the predetermined time $t_C$ after the electronic range request signal 28 has been received, the method 100 proceeds to step 116, to be described below. If the park pawl 22 is pulled out the park position by the predetermined time $t_C$ after the electronic range request signal 28 has been received, the method proceeds to step 118. At step 118, the method 100 includes sending the garage shift signal 30 to the shift valve 26 of the transmission 14. If the method 100 reaches step 118, the method 100 may end. At this point, the pull out of park and garage shift operations are complete.

As described above, if the grade exceeds one of a predetermined upgrade and a predetermined downgrade at step 106, if the park pawl 22 was not pulled out of the park position by the predetermined time $t_C$ after the electronic range request signal 28 was received in a previous shift from the park operating range to another operating range at step 108, or if the park pawl 22 is not pulled out the park position by the predetermined time $t_C$ after the electronic range request signal 28 has been received, at step 114 the method 100 may proceed to step 116. At step 116, the method 100 includes executing a first control action with respect to the vehicle 10. The first control action of step 116 may include increasing one of the line pressure $P_L$, the clutch pressures $P_{CL}$, and the idle speed $V_I$ of the engine 12.

After step 116, the method 100 may proceed to step 110, sending the pull out of park signal 30 to the shift valve 26 of the transmission 14, and then to step 114, determining, via the controller 20, if the park pawl 22 is not pulled out the park position by the predetermined time $t_C$ after the electronic range request signal 28 has been received. If the park pawl 22 is not pulled out of the park position by the predetermined time $t_C$ after the electronic range request signal 28 has been received, the method 100 may proceed to step 122, as described below. If the park pawl 22 is pulled out the park position by the predetermined time $t_C$ after the electronic range request signal 28 has been received, then the method proceeds to step 118, sending the garage shift signal 30 to the shift valve 26 of the transmission 14. If the method 100 reaches step 118, the method 100 may end. At this point, the pull out of park and garage shift operations are complete.

The method may include step 120, which includes receiving, via the controller 20 of FIG. 1, the brake application signal 66 from the brake application sensor 64 for the brake 62. The method 100 may include step 122, which includes determining, via the controller 20, if the electronic range request signal 28 to shift from the park operating range to a drive operating range is received from the electronic range selector device 18, the upgrade exceeds the predetermined upgrade, and the brake 62 is applied. If the electronic range request signal 28 to shift from the park operating range to the drive operating range is received from the electronic range selector device 18, the upgrade exceeds the predetermined upgrade, and the brake 62 is applied, the method 100 may proceed to step 124, as described below. If not, the method 100 may proceed to step 126. The predetermined upgrade of step 122 may be either the same as or different from the predetermined upgrade of step 106.

At step 126, the method may include determining, via the controller 20, if the electronic range request signal 28 to shift from the park operating range to a reverse operating range is received from the electronic range selector device 18, the downgrade exceeds the predetermined downgrade, and the brake 62 is applied. If the electronic range request signal 28 to shift from the park operating range to the reverse operating range is received from the electronic range selector device 18, the downgrade exceeds the predetermined downgrade, and the brake 62 is applied, the method 100 may proceed to step 128, as described below. If not, the method 100 may proceed to step 130, as described below. The predetermined downgrade of step 126 may be the same as or different from the predetermined downgrade of step 106.

At step 124, the method 100 may include executing a second control action. The second control action may include increasing one of a line pressure $P_L$, the clutch pressures $P_{CL}$, and the engine idle speed $V_I$ and applying the drive operating range. At step 128, the method 100 may include executing a third control action. The third control action may include increasing one of the line pressure $P_L$, the clutch pressures $P_{CL}$, and the engine idle speed $V_I$ and applying the reverse operating range. After one of step 124 and step 128, the method 100 may proceed to step 110, sending the pull out of park signal 30 to the shift valve 26 of the transmission 14. After step 110, the method 100 may proceed to step 114, determining, via the controller 20, if the park pawl 22 is not pulled out of the park position by the predetermined time $t_C$ after the electronic range request signal 28 has been received. If the park pawl 22 is not pulled out the park position by the predetermined time $t_C$ after the electronic range request signal 28 has been received, the method 100 may proceed to step 130, as described below. If the park pawl 22 is pulled out the park position by the predetermined time $t_C$ after the electronic range request signal 28 has been received, the method 100 may end. At this point, the pull out of park and garage shift operations are complete.

At step 130, the method 100 may include returning the transmission 14 to the park operating range and transmitting the indicator signal 70 to the indicator device 68. If the method 100 reaches step 130, the method 100 may end. At this point, the transmission 14 has been returned to the park operating range and the driver has been notified that the transmission 14 needs to be serviced.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an engine having an idle speed;
   a transmission connected to the engine and having:
      a hydraulic pressure source for supplying a hydraulic fluid at a line pressure;
      a plurality of clutches, each having a respective clutch pressure;
      a shift valve that is in fluid communication with the hydraulic pressure source and the plurality of clutches, wherein the shift valve is operable to shift the transmission to a requested operating range via the plurality of clutches;
      a park pawl that is pulled out of a park position to shift the transmission out of a park operating range via one or more of the clutches when the transmission is requested to shift from the park operating range to another operating range; and
      a park sensor configured to determine if the park pawl is pulled out of the park position; and
   an electronic transmission range selection (ETRS) system having a controller and an electronic range selector device, wherein the electronic range selector device is operable to transmit an electronic range request signal to the controller to request a shift of the transmission to the requested operating range;
   wherein the controller is programmed to detect a delay in pull out of the park pawl from the park position when the transmission is requested to shift from the park operating range to another operating range, and to control an action of the vehicle in response to the delay by:
      receiving the electronic range request signal to shift from the park operating range to another operating range from the electronic range selector device;
      receiving a park pawl position signal from the park sensor indicative of the park pawl being pulled out of the park position;
      determining if pull out of the park pawl from the park position has not occurred by a predetermined time after the range request signal has been received; and
      increasing one of the line pressure, the clutch pressures, and the idle speed if pull out of the park pawl from the park position has not occurred by the predetermined time.

2. The vehicle of claim 1, further comprising a grade sensor configured to detect an upgrade and a downgrade relative to the vehicle direction;
   wherein the controller is programmed to receive a grade signal from the grade sensor, to determine if the upgrade exceeds a predetermined upgrade and the downgrade exceeds a predetermined downgrade, and to increase one of the line pressure, the clutch pressures, and the idle speed when one of the predetermined upgrade and the predetermined downgrade is detected and the electronic range request signal to shift from the park operating range to another operating range is received from the electronic range selector device.

3. The vehicle of claim 2, further comprising a brake having a brake sensor for determining if the brake is applied;
   wherein the controller is programmed to receive a brake application signal from the brake sensor and to increase one of the line pressure, the clutch pressures, and the idle speed and to apply a drive operating range when the electronic range request signal to shift from the park operating range to the drive operating range is received from the electronic range selector device, the upgrade exceeds the predetermined upgrade, and the brake is applied; and
   wherein the controller is programmed to increase one of the line pressure, the clutch pressures, and the idle speed and to apply a reverse operating range when the electronic range request signal to shift from the park operating range to the reverse operating range is received from the electronic range selector device, the downgrade exceeds the predetermined downgrade, and the brake is applied.

4. The vehicle of claim 3, further comprising an indicator device;
   wherein the controller is programmed to return the transmission to the park operating range and to transmit an indicator signal to the indicator device if pull out of the park pawl from the park position has not occurred by the predetermined time after increasing one of the line pressure, the clutch pressures, and the idle speed and applying one of the drive operating range and the reverse operating range.

5. The vehicle of claim 1, wherein the controller is programmed to increase one of the line pressure, the clutch pressures, and the idle speed when the electronic range request signal to shift from the park operating range to another operating range is received from the electronic range selector device and pull out of the park pawl from the park position did not occur by the predetermined time in a previous shift from the park operating range to another operating range.

6. The vehicle of claim 1, wherein the controller is programmed to return the transmission to the park operating range if pull out of the park pawl from the park position has not occurred by the predetermined time after increasing one of the line pressure, the clutch pressures, and the idle speed.

7. The vehicle of claim 6, further comprising an indicator device;
wherein the controller is programmed to transmit an indicator signal to the indicator device if pull out of the park pawl from the park position has not occurred by the predetermined time after increasing one of the line pressure, the clutch pressures, and the idle speed.

8. A system for use in a vehicle having an engine and a transmission, the system comprising:
a hydraulic pressure source for supplying a hydraulic fluid at a line pressure;
a plurality of clutches, each having a respective clutch pressure;
a shift valve that is in fluid communication with the hydraulic pressure source and the plurality of clutches, wherein the shift valve is operable to shift the transmission to a requested operating range via the plurality of clutches;
a park pawl that is pulled out of a park position to shift the transmission out of a park operating range via one or more of the clutches when the transmission is requested to shift from the park operating range to another operating range;
a park sensor configured to determine if the park pawl is pulled out of the park position; and
an electronic transmission range selection (ETRS) system having a controller and an electronic range selector device, wherein the electronic range selector device is operable to transmit an electronic range request signal to the controller to request the shift of the transmission to the requested operating range; and
wherein the controller is in communication with the electronic transmission range selection system and the park sensor and is programmed to:
receive the electronic range request signal to shift from the park operating range to another operating range from the electronic range selector device;
receive a park pawl position signal from the park sensor indicative of the park pawl being pulled out of the park position;
determine if pull out of the park pawl from the park position has not occurred by a predetermined time after the range request signal has been received; and
increase one of the line pressure, the clutch pressures, and an idle speed of the engine if pull out of the park pawl from the park position has not occurred by the predetermined time.

9. The system of claim 8, further comprising a grade sensor configured to detect an upgrade and a downgrade relative to the vehicle direction;
wherein the controller is programmed to:
receive a grade signal from the grade sensor;
determine if the upgrade exceeds a predetermined upgrade and the downgrade exceeds a predetermined downgrade; and
increase one of the line pressure, the clutch pressures, and the idle speed when one of the predetermined upgrade and the predetermined downgrade is detected and the electronic range request signal to shift from the park operating range to another operating range is received from the electronic range selector device.

10. The system of claim 9, further comprising a brake having a brake sensor configured to determine if the brake is applied;
wherein the controller is programmed to:
receive a brake application signal from the brake sensor;
increase one of the line pressure, the clutch pressures, and the engine idle speed and apply a drive operating range when the electronic range request signal to shift from the park operating range to the drive operating range is received from the electronic range selector device, the upgrade exceeds the predetermined upgrade, and the brake is applied; and
increase one of the line pressure, the clutch pressures, and the engine idle speed and applying a reverse operating range when the electronic range request signal to shift from the park operating range to the reverse operating range is received from the electronic range selector device, the downgrade exceeds the predetermined downgrade, and the brake is applied.

11. The system of claim 10, further comprising an indicator device;
wherein the controller is programmed to return the transmission to the park operating range and transmit an indicator signal to the indicator device if pull out of the park pawl from the park position has not occurred by the predetermined time after increasing one of the line pressure, the clutch pressures, and the engine idle speed and applying one of the drive operating range and the reverse operating range.

12. The system of claim 8, wherein the controller is programmed to increase one of the line pressures, the clutch pressures, and the engine idle speed when the electronic range request signal to shift from the park operating range to another operating range is received from the electronic range selector device and pull out of the park pawl from the park position did not occur by the predetermined time in a previous shift from the park operating range to another operating range.

13. The system of claim 12, further comprising an indicator device;
wherein the controller is programmed to return the transmission to the park operating range and transmit an indicator signal to the indicator device if pull out of the park pawl from the park position has not occurred by the predetermined time after increasing one of the line pressure, the clutch pressures, and the engine idle speed.

14. The system of claim 8, further comprising an indicator device;
wherein the controller is programmed to return the transmission to the park operating range and transmit an indicator signal to the indicator device if pull out of the park pawl from the park position has not occurred by the predetermined time after increasing one of the line pressure, the clutch pressures, and the engine idle speed.

15. A method for controlling a vehicle having a transmission and an electronic transmission range selection (ETRS) system in response to a delay in pull out of a park pawl from a park position when a shift from a park operating range to another operating range is requested, the method comprising:
receiving, via a controller, an electronic range request signal from an electronic range selector device;
sending a pull out of park signal to a shift valve of the transmission;
receiving, via the controller, a park pawl position signal from a park sensor;

determining, via the controller, if the park pawl is not pulled out of the park position by a predetermined time after the electronic range request signal has been received; and executing a first control action with respect to the vehicle when the park pawl has not been pulled out of the park position by the predetermined time after the electronic range request signal has been received.

16. The method of claim 15, wherein executing the first control action includes increasing one of a line pressure, a clutch pressure, and an engine idle speed.

17. The method of claim 15, further comprising:
determining, via the controller, if the park pawl was not pulled out of the park position by the predetermined time after the electronic range request signal was received in a previous shift from the park operating range to another operating range; and executing the first control action with respect to the vehicle when the park pawl was not pulled out of the park position by the predetermined time after the electronic range request signal was received in the previous shift.

18. The method of claim 15, further comprising:
receiving, via the controller, a grade signal from a grade sensor;

determining, via the controller, if an upgrade exceeds a predetermined upgrade and a downgrade exceeds a predetermined downgrade; and executing the first control action with respect to the vehicle if one of the upgrade exceeds the predetermined upgrade and the downgrade exceeds the predetermined downgrade.

19. The method of claim 15, further comprising:
receiving, via the controller, a grade signal from a grade sensor;

receiving, via the controller, a brake application signal from a brake application sensor for a brake;

determining, via the controller, if an electronic range request signal to shift from the park operating range to a drive operating range is received from the electronic range selector device, an upgrade exceeds a predetermined upgrade, and the brake is applied;

determining, via the controller, if an electronic range request signal to shift from the park operating range to a reverse operating range is received from the electronic range selector device, a downgrade exceeds a predetermined downgrade, and the brake is applied;

executing a second control action including increasing one of a line pressure, the clutch pressure, and the engine idle speed and applying the drive operating range when the electronic range request signal to shift from the park operating range to the drive operating range is received from the electronic range selector device, the upgrade exceeds the predetermined upgrade, and the brake is applied; and executing a third control action including increasing one of the line pressure, the clutch pressure, and the engine idle speed and applying the reverse operating range when the electronic range request signal to shift from the park operating range to the reverse operating range is received from the electronic range selector device, the downgrade exceeds the predetermined downgrade, and the brake is applied.

20. The method of claim 15, further comprising:
returning the transmission to the park operating range and transmitting an indicator signal to an indicator device if pull out of the park pawl from the park position has not occurred by the predetermined time after executing the first control action.

\* \* \* \* \*